US00RE35646E

United States Patent [19]

Guaraldi et al.

[11] E Patent Number: Re. 35,646

[45] Reissued Date of Patent: Nov. 4, 1997

[54] PRINTING UNIT WITH RELEASABLE BEARING CLAMP

[75] Inventors: Glenn Alan Guaraldi, Kingston; James B. Vrotacoe, Rochester, both of N.H.; James Warren Geary, Fairfield, Conn.

[73] Assignee: Heidelberg Harris Inc., Dover, N.H.

[21] Appl. No.: 523,997

[22] Filed: Sep. 5, 1995

Related U.S. Patent Documents

Reissue of:

[64] Patent No.: 5,241,905
Issued: Sep. 7, 1993
Appl. No.: 967,141
Filed: Oct. 27, 1992

[51] Int. Cl.[6] ..... B41F 5/00

[52] U.S. Cl. ..... 101/216; 101/375; 101/477

[58] Field of Search ..... 101/212, 216, 101/219, 375, 376, 152, 153, 141, 142, 477, 479

[56] References Cited

U.S. PATENT DOCUMENTS

| | | | |
|---|---|---|---|
| 2,925,037 | 2/1960 | Fischer | 101/216 |
| 3,738,265 | 6/1973 | Saueressig | 101/152 |
| 4,807,527 | 2/1989 | Knauer | 101/216 |
| 4,823,693 | 4/1989 | Kobler | 101/218 |
| 4,913,048 | 4/1990 | Tittgemeyer | 101/216 |
| 5,022,251 | 6/1991 | Negrussi | 101/216 |
| 5,101,726 | 4/1992 | Lubke et al. | 101/216 |
| 5,129,319 | 7/1992 | Umetsu | 101/216 |
| 5,134,937 | 8/1992 | Derivi et al. | 101/153 |

*Primary Examiner*—Eugene H. Eickholt
*Attorney, Agent, or Firm*—Kenyon & Kenyon

[57] ABSTRACT

A printing unit (10) includes a blanket cylinder (20), a bearing assembly (56) and a door assembly (72). The blanket cylinder (20) carries a tubular printing blanket (36). The bearing assembly (56) includes a bearing housing (58) fixed to the stub shaft (50) on the end of the blanket cylinder (20). The door assembly (72) includes a door (82) which is supported for pivotal movement on a frame wall (22) of the printing unit (10). The door (82) has a closed position in which it extends across an opening (76) in the frame wall (22), and an open position in which it does not extend across the opening (76) in the frame wall (22). A clamping assembly clamps the bearing housing (58) on the door (82) when the blanket cylinder (20) rotates during a printing operation. The clamping assembly includes a first clamp (100) which fixed to the door (82) and a second clamp (102) which is supported on the door (82) for movement relative to the first clamp (100). The first clamp (100) is engaged with the bearing housing (58) when the door (82) is closed. The second clamp (102) is movable into and out of engagement with the bearing housing (58) when the door (82) is closed. The door assembly (72) is movable with the blanket cylinder (20) for throw-off.

21 Claims, 6 Drawing Sheets

PRINTING UNIT WITH RELEASABLE BEARING CLAMP

Matter enclosed in heavy brackets [ ] appears in the original patent but forms no part of this reissue specification; matter printed in italics indicates the additions made by reissue.

FIELD OF THE INVENTION

The present invention relates to a printing unit with rotatable printing cylinders.

BACKGROUND OF THE INVENTION

A rotary printing unit has a plurality of rotatable printing cylinders. An offset printing unit, for example, has a plate cylinder and a blanket cylinder. The plate cylinder and the blanket cylinder are supported at their opposite ends in the frame of the printing unit. The ends of the cylinders are supported for rotation in the frame by respective bearing assemblies. The plate cylinder carries a printing plate having a surface on which an inked image is defined. The blanket cylinder carries a printing blanket. When the cylinders rotate in the printing unit, the plate on the plate cylinder transfers the inked image to the blanket on the blanket cylinder at a nip between the plate cylinder and the blanket cylinder. The blanket on the blanket cylinder subsequently transfers the inked image to the material being printed, such as a web of paper.

The printing plate and/or the printing blanket can be formed as a tube which is mounted on the respective cylinder by sliding the tube telescopically over the cylinder. When such a tubular printing member is to be moved telescopically over a cylinder, the cylinders are first moved into thrown-off positions in which they are speed from each other across the nip. An opening must be provided in the adjacent side wall of the frame so that the tubular printing member can be moved longitudinally past the side wall of the frame through the opening. A clearance must also be provided for the tubular printing member to move past the bearing which supports the end of the cylinder on the adjacent side wall of the frame.

SUMMARY OF THE INVENTION

In accordance with the present invention, a printing unit comprises a rotatable printing cylinder, a bearing assembly and a frame. The bearing assembly supports the cylinder to rotate about its axis, and includes a bearing which is supported on the cylinder. The frame has a side wall with an opening. A door is supported on the side wall of the frame for movement relative to the side wall. The door is movable between a closed position in which it extends across the opening and an open position in which it does not extend across the opening.

The printing unit further includes a clamping means for releasably clamping the bearing on the door. The clamping means includes first and second clamps which are supported on the door for movement with the door relative to the side wall of the frame. The clamps are movable relative to each other between clamping positions in which the clamps hold the bearing on the door and releasing positions in which the clamps release the bearing from the door.

In a preferred embodiment of the present invention, the door is supported on the side wall of the frame to move pivotally about a horizontal throw-off axis when the door is in the closed position. When a tubular printing member is to be moved telescopically over the cylinder, the cylinder is first moved into a thrown-off position in which it is spaced from the adjacent cylinder in the printing unit. The door and the bearing, which is clamped to the door by the clamping means, both move with the cylinder when it is moved into its thrown-off position. The clamping means then releases the bearing from the door, and the door is moved away from the bearing and the cylinder to its open position. When the door is in its open position, the tubular printing member can be moved through the opening in the side wall and telescopically over the cylinder and the bearing.

BRIEF DESCRIPTION OF THE DRAWINGS

The foregoing and other features of the present invention will become apparent to those skilled in the art upon reading the following description of a preferred embodiment of the invention in view of the accompanying drawings wherein.

DESCRIPTION OF A PREFERRED EMBODIMENT

Figure 1:
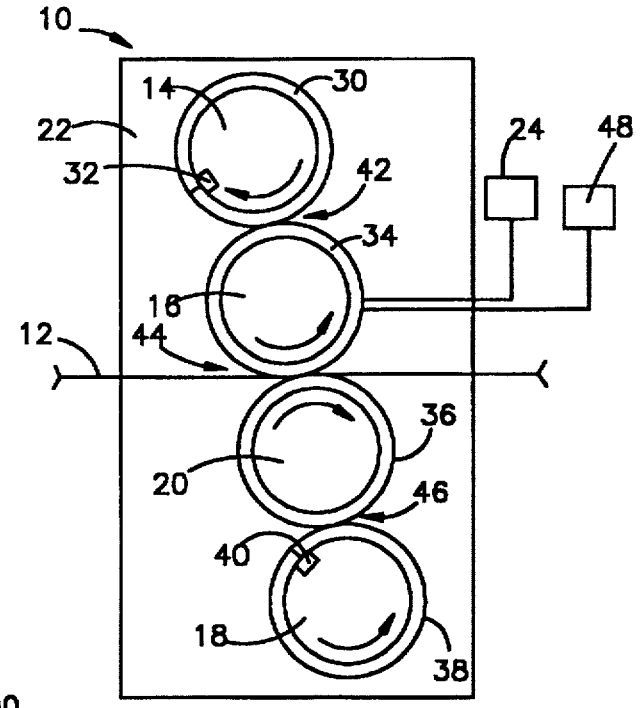
FIG. 1 is a schematic view of a printing unit constructed in accordance with the present invention.

A printing unit 10 constructed in accordance with the present invention is shown schematically in FIG. 1. The printing unit 10, by way of example, is an offset lithographic printing unit for printing on opposite sides of a web 12. The printing unit 10 includes an upper plate cylinder 14 and an upper blanket cylinder 16 above the web 12, and a lower plate cylinder 18 and a lower blanket cylinder 20 below the web 12. The cylinders 14–20 are supported for rotation at their opposite ends in a frame having a pair of side walls 22, one of which is shown in FIG. 1. A motor 24 drives a gear train (not shown) which is connected to the cylinders 14–20 to rotate the cylinders 14–20 as indicated by the arrows shown in FIG. 1. The motor 24 and the gear train can be constructed as known in the art.

The upper plate cylinder 14 carries a printing plate 30 which defines an image to be printed. The printing plate 30 is formed as a thin metal sheet, and is mounted on the upper plate cylinder 14 by wrapping the sheet around the upper plate cylinder 14. A locking mechanism 32 in the upper plate cylinder 14 holds the printing plate 30 securely on the upper plate cylinder 14. The upper blanket cylinder 16 carries a printing blanket 34. The printing blanket 34 is formed as a tube which is mounted on the upper blanket cylinder 16 by sliding the tube telescopically over the upper blanket cylinder 16. Another tubular printing blanket 36 is similarly mounted on the lower blanket cylinder 20, and another printing plate 38 is held on the lower plate cylinder 18 by a locking mechanism 40.

When the cylinders 14–20 are being rotated by the motor 24 and the gear train, ink is applied to both of the printing plates 30 and 38 to form inked images on the printing plates 30 and 38. The inked image on the upper printing plate 30 is transferred to the upper printing blanket 34 at the nip 42 between the upper plate cylinder 14 and the upper blanket cylinder 16. The upper printing blanket 34 subsequently transfers the inked image to the upper side surface of the web 12 at the nip 44 between the upper and lower blanket cylinders 16 and 20. The lower printing plate 38 transfers its inked image to the lower printing blanket 36 at the nip 46 between the lower plate cylinder 18 and the lower blanket cylinder 20. The lower printing blanket 36 subsequently transfers the inked image to the lower side surface of the web 12 at the nip 44. The printing unit 10 thus prints simultaneously on opposite sides of the web 12.

When a printing operation is stopped, a throw-off mechanism 48 moves the upper plate cylinder 14, the lower plate cylinder 18, and the lower blanket cylinder 20 into thrown-off positions. The throw-off mechanism 48 does not move the upper blanket cylinder 16, but when the other cylinders 14, 18 and 20 are in their thrown-off positions, all of the cylinders 14, 16, 18 and 20 are spaced from each other across the nips 42, 44 and 46.

Figure 2:
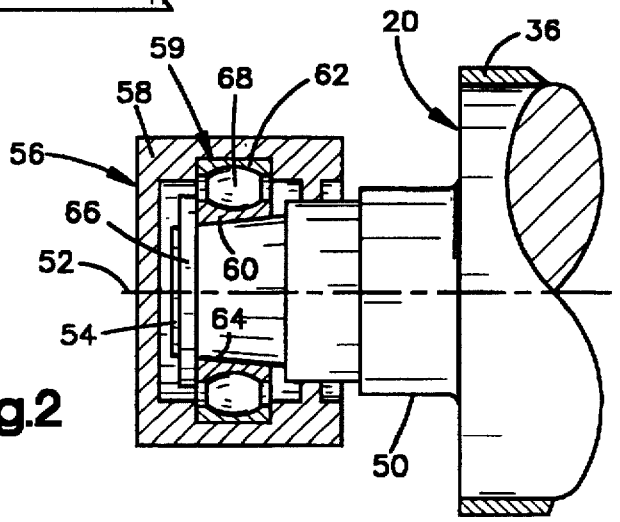
FIG. 2 is a partial view of parts of the apparatus of FIG. 1.

One end of the lower blanket cylinder 20 is shown in FIG. 2. This end of the lower blanket cylinder 20 has a stub shaft 50. The stub shaft 50 is centered on the longitudinal central axis 52 of the cylinder 20, and has a tapered end portion 54. A bearing assembly 56 is supported coaxially on the stub shaft 50. The bearing assembly 56 includes a cylindrical bearing housing 58. The diameter of the bearing housing 58 is less than the diameter of the lower blanket cylinder 20. The tubular printing blanket 34 can therefore be moved axially over the bearing housing 58.

The bearing housing 58 contains a bearing 59 which comprises an inner race 60 and an outer race 62. The inner race 60 has a tapered inner surface 44 received over the tapered end portion 54 of the stub shaft 50, and is held in place on the tapered end portion 54 by a collar 66. The bearing 59 further comprises a plurality of spherical bearing rollers 68 which are located between the inner race 60 and the outer race 62. The bearing rollers 68 support the outer race 62 and the bearing housing 58 for rotation about the cylinder axis 52 relative to the inner race 60 and the blanket cylinder 20. The bearing housing 58 is sealed to block the entry of contaminants which could interfere with operation of the bearing 59. The adjacent end of the upper blanket cylinder 16 also is constructed as shown in FIG. 2, and supports a bearing assembly like the bearing assembly 56.

As shown in FIG. 2, the lower blanket cylinder 20 and the bearing housing 58 are normally coaxial with each other. However, the lower blanket cylinder 20 tends to bend slightly under the influence of forces exerted against it in the printing unit 10 during a printing operation. The spherical contour of the bearing rollers 68 permits the stub shaft 50 and the inner race 60 to tilt slightly out of coaxial alignment with the outer race 62 and the bearing housing 58 upon such bending of the lower blanket cylinder 20. The upper blanket cylinder 16 and the associated bearing assembly have the same relationship.

Figure 3:
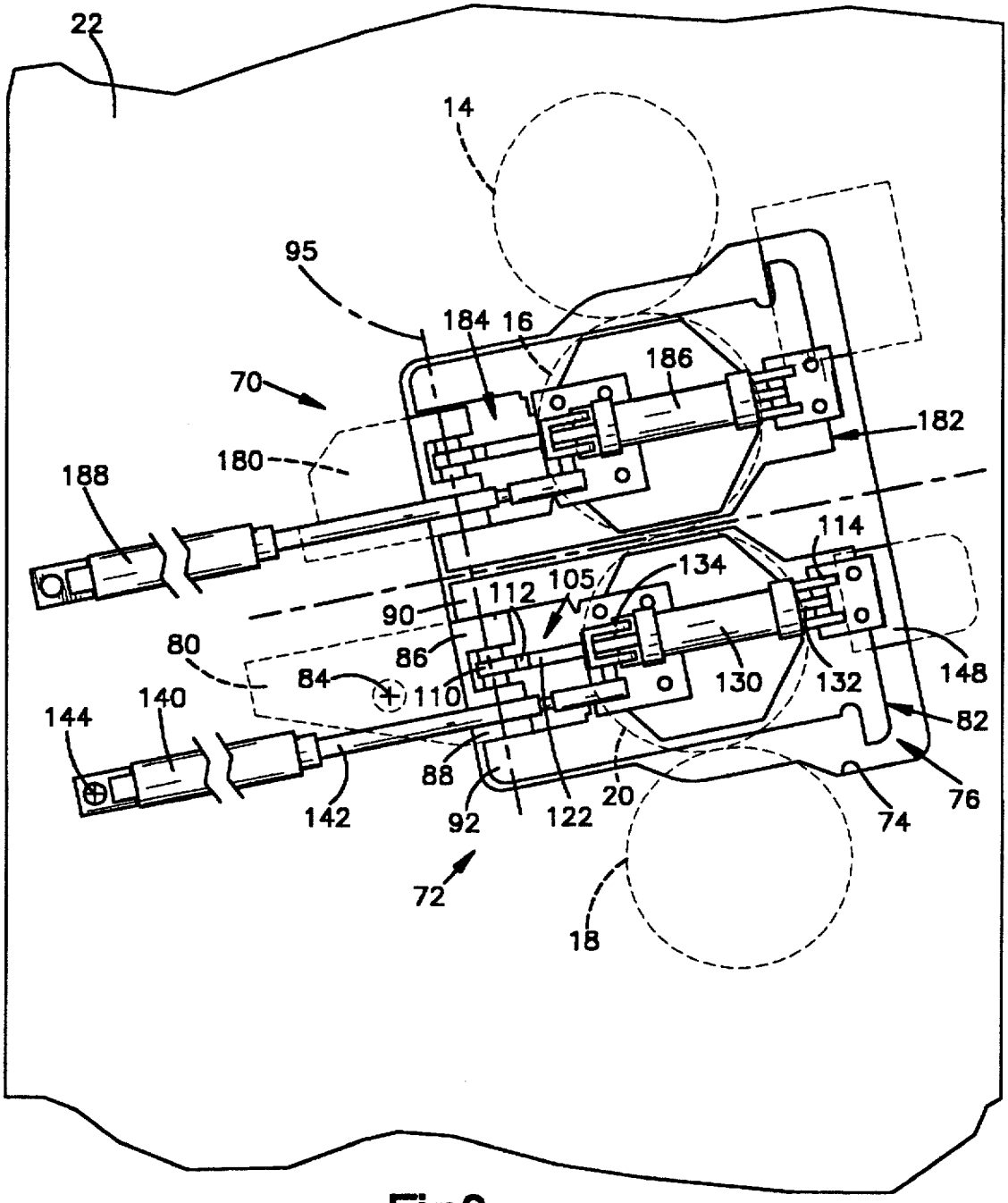
FIG. 3 is a side view of the apparatus of FIG. 1.

As shown in FIG. 3, the printing unit 10 further includes a pair of door assemblies. The door assemblies are supported on the side wall 22 adjacent to the ends of the blanket cylinders 16 and 20 where the bearing assemblies 56 are located. An upper door assembly 70 is associated with the upper blanket cylinder 16. A lower door assembly 72 is associated with the lower blanket cylinder 20. The side wall 22 has an inner edge surface 74 which extends around the ends of the upper and lower blanket cylinders 16 and 20. The inner edge surface 74 of the side wall 22 thus defines an opening 76 which extends across the ends of the upper and lower blanket cylinders 16 and 20. When the upper door assembly 70 is open, the tubular printing blanket 34 is movable telescopically onto and off of the upper blanket cylinder 16 through the opening 76. When the lower door assembly 72 is open, the tubular printing blanket 36 is movable telescopically onto and off of the lower blanket cylinder 20 through the opening 76.

Figure 4:
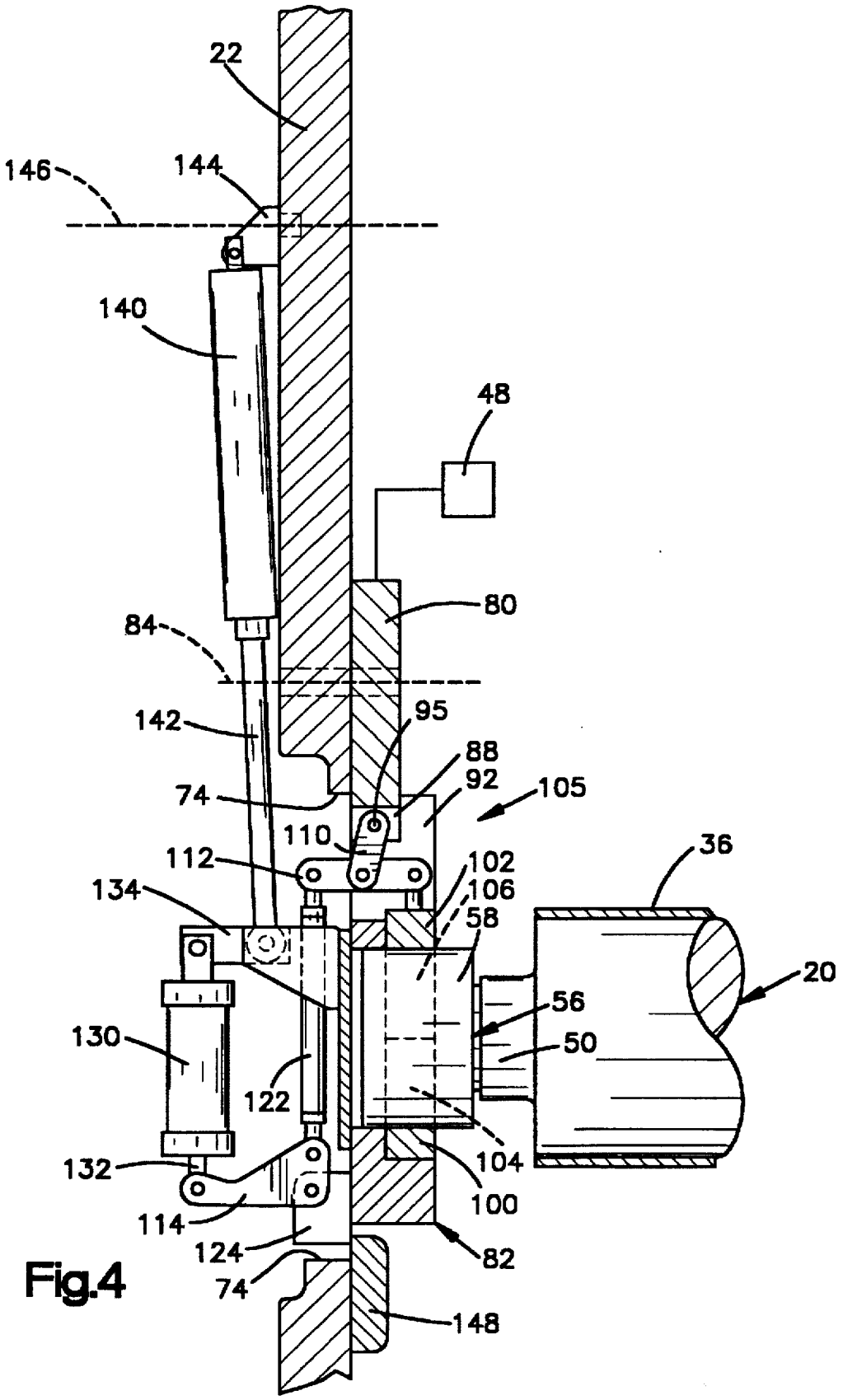
FIG. 4 is a plan view of parts shown in FIG. 3.
Figure 5:
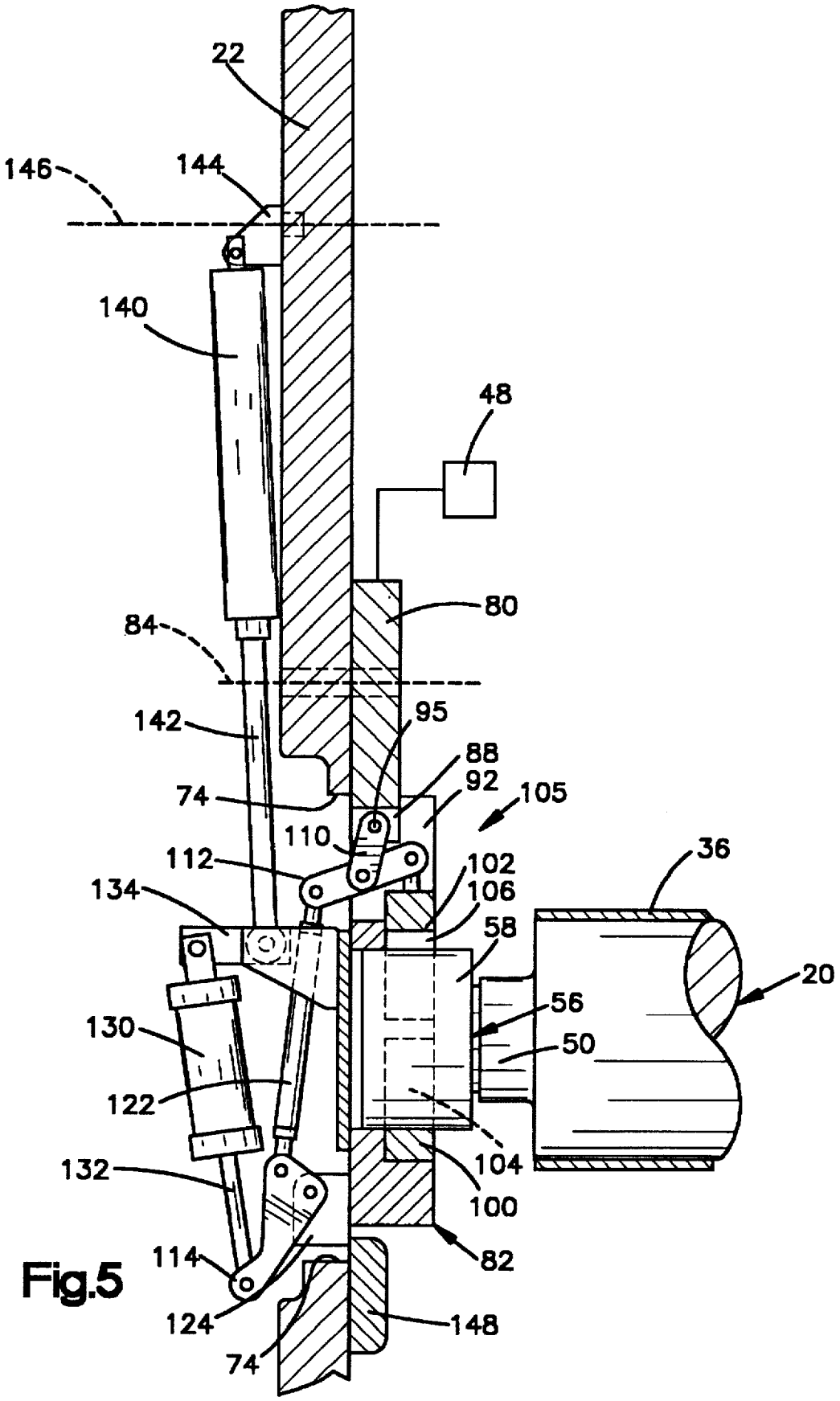
FIG. 5 is a view of the parts shown in FIG. 4 in different positions.
Figure 6:
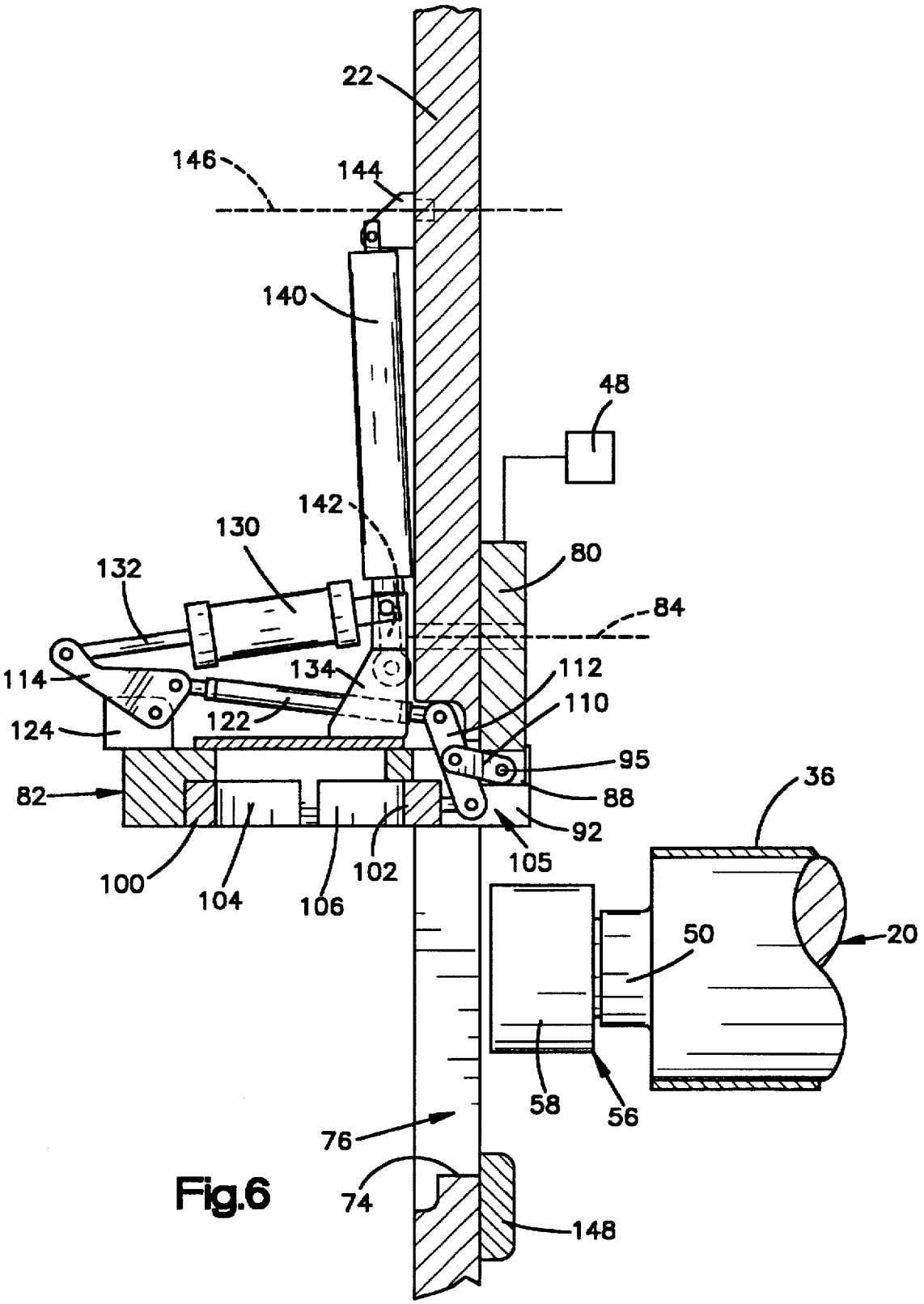
FIG. 6 is a view of the parts shown in FIG. 5 in different positions.

As shown in FIGS. 3 and 4–6, the lower door assembly 72 includes a bracket 80 and a door 82. The bracket 80 is supported on the side wall 22 for pivotal movement about a horizontal throw-off axis 84. The bracket 80 has upper and lower arms 86 and 88 which extend past the edge surface 74 on the side wall 22 and partially across the opening 76. The door 82 has upper and lower arms 90 and 92 which extend over the upper and lower arms 86 and 88 of the bracket 80, respectively. The upper and lower arms 90 and 92 of the door 82 are supported on the bracket 80 for pivotal movement about a substantially vertical axis 95. The door 82 is thus supported for pivotal movement between a closed position, as shown in FIGS. 3–5, and an open position, as shown in FIG. 6.

Figure 7:
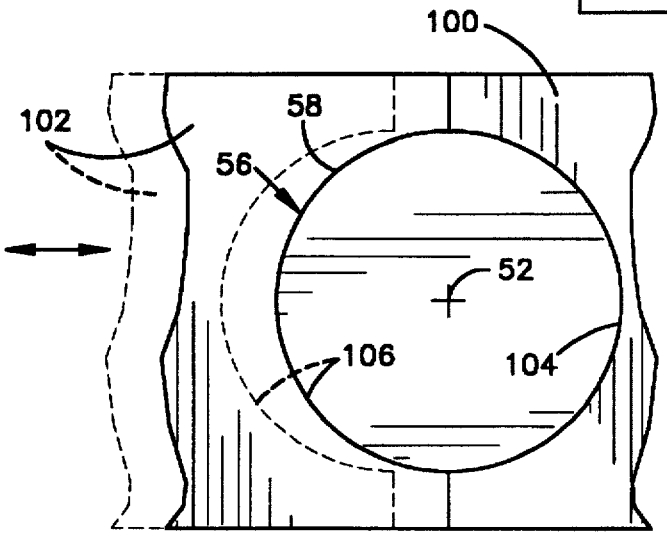
FIG. 7 is a partial view of parts shown in FIGS. 4–6.

The lower door assembly 72 also includes a pair of clamps 100 and 102. The first clamp 100 has a semi-cylindrical clamping surface 104, and is fixed to the door 82. The semi-cylindrical clamping surface 104 fits closely against the outer surface of the cylindrical bearing housing 58, as shown in FIG. 7. The second clamp 102 has a semi-cylindrical clamping surface 106, and is supported on the door 82 for movement relative to the first clamp 100. The semi-cylindrical clamping surface 106 also fits closely against the outer surface of the cylindrical bearing housing 58. As indicated by the arrow shown in FIG. 7, the second clamp 102 is movable back and forth between a clamping position and a releasing position. When the second clamp 102 is in the clamping position, it abuts the first clamp 100, as shown in solid lines in FIG. 7. When the second clamp 102 is in the releasing position, it is spaced from the first clamp 100, as shown in dashed lines in FIG. 7.

The second clamp 102 on the door 82 is moved between the clamping position and the releasing position by a linkage assembly 105 which is mounted on the door 82. The linkage assembly 105 includes a first link 110, a second link 112 and a third link 114. The inner end of the first link 110 is supported between the upper and lower arms 86 and 88 of the bracket 80 for pivotal movement about the vertical axis 95. The outer end of the first link 110 is pivotally connected to the second link 112 between the opposite ends of the second link 112. The second link 112 extends through the door 82 between the upper and lower arms 90 and 92 of the door 82. The inner end of the second link 112 is pivotally connected to the second clamp 102 on the door 82. The outer end of the second link 112 is pivotally connected to a turnbuckle 122. The turnbuckle 122 extends from the second link 112 to the third link 114, and is pivotally connected to the third link 114. The third link 114 is pivotally connected to a first bracket 124 on the door 82.

A pressure cylinder 130 is pivotally connected to a second bracket 134 on the door 82. The pressure cylinder 130 has a piston rod 132 which is pivotally connected to the third link 114. When the piston rod 132 moves out of the pressure cylinder 130 from the position shown in FIG. 4 to the position shown in FIG. 5, the piston rod 132 moves the third link 114 in a counterclockwise direction about the first bracket 124, which is fixed to the door 82. The turnbuckle 122 is simultaneously moved with the third link 114 from the position shown in FIG. 4 to the position shown in FIG. 5. The turnbuckle 122 moves the second link 112 pivotally relative to the first link 110 in a counterclockwise direction. The second clamp 102 on the door 82, which is connected to the inner end of the second link 112, is simultaneously moved by the second link 112 from the clamping position shown in FIG. 4 to the releasing position shown in FIG. 5. When the piston rod 132 is moved back into the pressure cylinder 130, the second clamp 102 on the door 82 is moved back from the releasing position shown in FIG. 5 to the clamping position shown in FIG. 4. If the bearing housing 58 becomes tilted out of coaxial alignment with the cylinder 20 when it is not clamped between the clamps 100 and 102, the second clamp 102 will move against the bearing housing 58 to move it back into coaxial alignment with the cylinder 20 when the second clamp 102 moves toward the clamping position.

In the preferred embodiment of the invention, the third link 114 is moved into an over-center position when the linkage assembly moves the second clamp 102 back from the releasing position shown in FIG. 5 to the clamping position shown in FIG. 4. Specifically, the pivotal connection between the third link 114 and the turnbuckle 122 is moved in a clockwise direction over the center of the pivotal connection between the third link 114 and the first bracket 124 on the door 82. The pivotal connection between the third link 114 and the turnbuckle 122 is thus moved slightly to the right of the pivotal connection between the third link 114 and the first bracket 124, as shown in FIG. 4. When the third link is in the over-center position, a force urging the second clamp 102 to move out of its clamping position will urge the third link 114 to move in the clockwise direction. However, further movement of the third link 114 in the clockwise direction is blocked by the piston rod 132 and an end stop in the pressure cylinder 130. The linkage assembly, the piston rod 132 and the pressure cylinder 130 thus hold the second clamp 102 in the clamping position even if the pressure in the pressure cylinder 130 fails.

The lower door assembly 72 further includes an actuating assembly for opening and closing the door 82. The actuating assembly includes a pressure cylinder 140 with a piston rod 142. The pressure cylinder 140 is pivotally connected to a third bracket 144. The third bracket 144 is supported on the side wall 22 for pivotal movement about a horizontal axis 146. The piston rod 142 is pivotally connected to the second bracket 134 on the door 82. When the piston rod 142 moves into the pressure cylinder 140 from the position shown in FIG. 5 to the position shown in FIG. 6, the piston rod 142 moves the door 82 pivotally about the vertical axis 95 in a clockwise direction. The piston rod 142 thus moves the door 82 from the closed position to the open position. When the piston rod 142 is subsequently moved back out of the pressure cylinder 148 from the position shown in FIG. 6 to the position shown in FIG. 5, it moves the door 82 back from the open position to the closed position. A stop plate 148 on the side wall 22 blocks movement of the door 82 in a counterclockwise direction beyond the closed position.

When the printing unit 10 is operating to print on the web 12, the lower door assembly 72 takes the position shown in FIG. 4. The door 81 is closed, and the second clamp 102 is in its clamping position. The first and second clamps 100 and 102 engage the bearing housing 58 on the end of the lower blanket cylinder 20, as shown in solid lines in FIG. 7. The semi-cylindrical surfaces 104 and 106 on the first and second clamps 100 and 102 abut the cylindrical outer surface of the bearing housing 58 to hold the bearing assembly 56 and the lower blanket cylinder 20 on the door 82. The force with which the second clamp 102 is pressed against the bearing housing 58 can be adjusted by adjusting the length of the turnbuckle 122. As described above, the linkage assembly 105, the piston rod 132 and the pressure cylinder 130 hold the second clamp 102 in its clamping position even if the pressure in the pressure cylinder 130 fails. Additionally, the close fit between the cylindrical outer surface of the bearing housing 58 and the semi-cylindrical clamping surfaces 104 and 106 is designed to permit the bearing housing 58 to slide axially against the clamping surfaces 104 and 106 upon thermal expansion of the blanket cylinder 20 during a printing operation. The lower door assembly 72 thus supports the lower blanket cylinder 20 on the side wall 12 while the lower blanket cylinder 20 is rotating during a printing operation.

When a printing operation is interrupted to replace the tubular printing blanket 36 on the lower blanket cylinder 20, the printing cylinders 14, 18 and 20 are moved into their thrown-off positions by the throw-off mechanism 48. The throw-off mechanism 48 is associated with the bracket 80 on the side wall 22 to move the bracket 80 pivotally about the horizontal throw-off axis 84. The door 82 moves with the bracket 80 about the horizontal throw-off axis 84. The pressure cylinder 140 and the piston rod 142, which are connected to the second bracket 134 on the door 82, move with the door 82 pivotally about the horizontal axes 84 and 146. The bearing assembly 56 and the lower blanket cylinder 20, which are supported on the door 82 by the clamps 100 and 102, also move with the door 82. The lower blanket cylinder 20 is thus moved into its thrown-off position while it remains supported on the door 82.

After the lower blanket cylinder 20 is moved into its thrown-off position, the second clamp 102 is moved from the clamping position to the releasing position, as shown in FIG. 5. A suitable counterpoise mechanism (not shown) then supports the lower blanket cylinder 20 in the printing unit 10 from the opposite end of the lower blanket cylinder 20. The door 82 is then moved from the closed position to the open position, as shown in FIG. 6. The tubular printing blanket 36 on the lower blanket cylinder 20 can then be moved axially through the opening 76 in the side wall 22.

The lower door assembly 72 is described above in detail. The upper door assembly 70 includes a bracket 180, a door 182 with clamps, a linkage assembly 184 and two pressure cylinders 186 and 188 which are substantially the same as the corresponding parts of the lower door assembly 72. However, the upper door assembly 70 differs from the lower door assembly 72 in that the bracket 180 is fixed to the side wall 22 rather than being supported for pivotal movement about a horizontal throw-off axis. The bracket 180 is fixed to the side wall 22 because the upper blanket cylinder 16, which is supported by the upper door assembly 70, is not moved by the throw-off mechanism 48.

Figure 8:
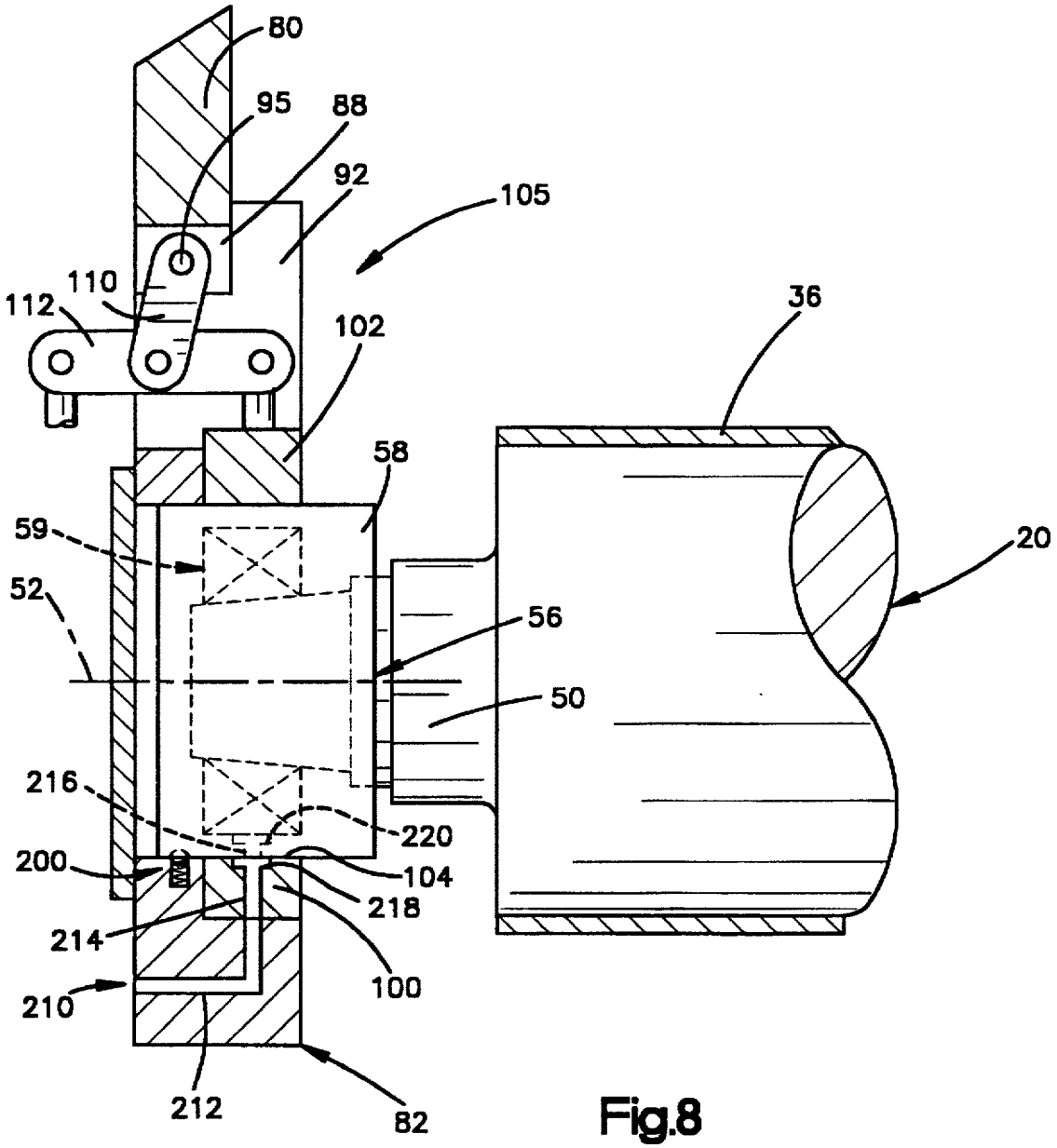
FIG. 8 is a partial schematic view showing other parts of the apparatus of FIG. 1.

Other parts of the printing unit 10 are illustrated schematically in FIG. 8. As shown in FIG. 8, the bearing housing 58 and the door 82 together include a spring loaded ball detent assembly 200. As described above, the bearing housing 58 is rotatable about the axis 52 relative to the cylinder 20. The ball detent assembly 200 acts between the bearing housing 58 and the door 82 to hold the bearing housing 58 from rotating about the axis 52 when the door 82 is in the closed position.

As further shown schematically in FIG. 8, the bearing housing 58, the first clamp 100 and the door 82 further include surfaces defining a passage 210 for directing a lubricant to the bearing 59 in the bearing housing 58. The passage 210 has first, second and third portions 212, 214, and 216. The first portion 212 of the passage 210 extends through the door 82. The second portion 214 extends through the first clamp 100 from the first portion 212 to the third portion 216. The second portion 214 of the passage 210 terminates in a groove 218 which extends circumferientially on the clamping surface 104. The third portion 216 of the passage 210 extends through the bearing housing 58 and terminates in a groove 220. The groove 220 communicates with the space between the inner and outer races 60 and 62 in the bearing 59. The third portion 216 of the passage 210 thus communicates the groove 218 at the first clamp 100 with the bearing 59.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a rotatable printing cylinder (20) having a cylinder axis (52);

a bearing assembly (56) for supporting said cylinder (20) to rotate about said cylinder axis (52), said bearing assembly (56) including a bearing (59) supported on said cylinder (20);

a frame wall (22) having a surface means (74) defining an opening (76);

a door (82) supported on said frame wall (22) for movement relative to said frame wall (22), said door (82) being movable between a closed position in which said door (82) extends across said opening (76) and an open position in which said door (82) does not extend across said opening (76); and clamping means for releasably clamping said bearing (59) on said door (82), said clamping means including first and second clamps (100, 102) supported on said door (82) for movement with said door (82) relative to said frame wall (22), said clamps (100, 102) being movable relative to each other between clamping positions in which said clamps (100, 102) hold said bearing (59) on said door (82) and releasing positions in which said clamps (100, 102) release said bearing (59) from said door (82).

2. Apparatus as defined in claim 1 wherein said door (82) is supported on said frame wall (22) for pivotal movement about a horizontal throw-off axis (84) when said door (82) is in said closed position.

3. Apparatus as defined in claim 2 wherein said first clamp (100) is fixed to said door (82), said second clamp (102) being supported on said door (82) for movement relative to said first clamp (100), said first clamp (100) being engaged with said bearing (59) when said door (82) is in said closed position, said second clamp (102) being movable into and out of engagement with said bearing (59) when said door (82) is in said closed position.

4. Apparatus as defined in claim 3 wherein said bearing assembly (56) further includes a bearing housing (58) containing said bearing (59), said first and second clamps (100, 102) engaging said bearing (59) through said bearing housing (58) when in said clamping positions.

5. Apparatus as defined in claim 4 wherein said bearing housing (58) has a cylindrical outer surface, said first clamp (100) having a semi-cylindrical clamping surface (104) which fits closely against said cylindrical outer surface on one side of said bearing housing (58) when said first clamp (100) is engaged with said bearing housing (58), said second clamp (102) having a semi-cylindrical clamping surface (106) which fits closely against said cylindrical outer surface on the opposite side of said bearing housing (58) when said second clamp (102) is engaged with said bearing housing (58).

6. Apparatus as defined in claim 1 wherein said clamping means further comprises a first pressure cylinder (130) mounted on said door (82), a first piston rod movable (132) in said first pressure cylinder (130), and linkage means (105) for connecting said second clamp (102) with said first piston rod (132), said linkage means (105) moving said second clamp (102) relative to said first clamp (100) in response to movement of said first piston rod (132) in said first pressure cylinder (130).

7. Apparatus as defined in claim 6 wherein said linkage means (105) has an over-center condition in which said second clamp (102) is held in engagement with said bearing (59) independently of pressure in said first pressure cylinder (130).

8. Apparatus as defined in claim 6 further comprising a second pressure cylinder (140) mounted on said frame wall (22), a second piston rod (142) movable in said second pressure cylinder (140), and means for connecting said door (82) with said second piston rod (142), said connecting means moving said door (82) between said open and closed positions upon movement of said second piston rod (142) in said second pressure cylinder (140).

9. Apparatus as defined in claim 8 wherein said second pressure cylinder (140) is supported for pivotal movement about said horizontal throw-off axis (146) with said door (82).

10. Apparatus as defined in claim 1 wherein said clamping means permits said bearing (59) to move axially relative to said first and second clamps (100, 102) under the influence of thermal expansion of said cylinder (20) when said first and second clamps (100, 102) are in said clamping portions.

11. Apparatus as defined in claim 1 wherein said bearing assembly (56) further includes a bearing housing (58) containing said bearing (59), said bearing housing (58) being supported on said cylinder (20) to move into and out of coaxial alignment with said cylinder (20) when said door (82) is in said open position, said first and second clamps (100, 102) engaging said bearing (59) through said bearing housing (58) when in said clamping positions, at least one of said clamps (100, 102) being movable against said bearing housing (58) to move said bearing housing (58) into coaxial alignment with said cylinder (20) when moving from said releasing position to said clamping position.

12. Apparatus as defined in claim 1 wherein said bearing assembly (56) further includes a bearing housing (58) containing said bearing (59), said bearing housing (58) being supported on said cylinder (20) and axially fixed relative to said cylinder (20).

13. Apparatus as defined in claim 12 wherein said being assembly (56) further includes means for sealing said bearing housing (58) from the entry of contaminants.

14. Apparatus as defined in claim 12 further comprising lubricating means for lubricating said bearing (59), said lubricating means including a passage (210) for directing a lubricant to flow from said door (82) to said bearing (59).

15. Apparatus as defined in claim 14 wherein said passage has a portion (212) extending through said door (82) and a portion (216) extending through said bearing housing (58).

16. Apparatus as defined in claim 12 wherein said bearing housing (58) is supported on said cylinder (20) to rotate about said cylinder axis (52) relative to said cylinder (20), and further comprising means (200) for blocking rotation of said bearing housing (58) relative to said cylinder (20) when said door (82) is in said closed position.

17. Apparatus as defined in claim 16 wherein said means (200) for blocking rotation includes a spring loaded ball detent engagable between said door 82 and said bearing housing (58).

*18. Apparatus comprising:*

*a rotatable printing cylinder (20) having a cylinder axis (52);*

*a bearing assembly (56) for supporting said cylinder (20) to rotate about said cylinder axis (52), said bearing assembly (56) including a bearing (59) supported on said cylinder (20);*

*a frame wall (22) having a surface means (74) defining an opening (76);*

*a door (82) supported on said frame wall (22) for movement relative to said frame wall (22), said door (82) being movable between a closed position in which said door (82) extends across said opening (76) and an open position in which said door (82) does not extend across said opening (76); and*

*first and second clamps (100, 102) movable relative to each other between clamping positions in which said clamps (100, 102) hold said bearing (59) and releasing positions in which said clamps (100, 102) release said bearing (59);*

*said second clamp slidingly moveable into and out of engagement with said bearing in a direction perpendicular to the cylinder axis.*

*19. The apparatus as recited in claim 18, wherein the second clamp has a semi-cylindrical clamping surface.*

*20. The apparatus as recited in claim 18, wherein the second clamp abuts the first clamp in its clamping position.*

*21. The apparatus as recited in claim 18, further comprising a tubular printing blanket for placement onto the rotatable printing cylinder through the opening.*

* * * * *